United States Patent [19]

Schmid

[11] Patent Number: 4,937,596

[45] Date of Patent: Jun. 26, 1990

[54] INK PRINTER HEAD

[75] Inventor: Karl-Heinz Schmid, Munich, Fed. Rep. of Germany

[73] Assignee: Siemens Aktiengesellschaft, Berlin and Munich, Fed. Rep. of Germany

[21] Appl. No.: 393,220

[22] Filed: Aug. 14, 1989

[30] Foreign Application Priority Data

Sep. 28, 1988 [DE] Fed. Rep. of Germany ....... 3832894

[51] Int. Cl.$^{5}$ .............................................. G01D 15/18

[52] U.S. Cl. ................................ 346/140 PD; 346/75

[58] Field of Search ............... 346/75, 140 IJ, 140 PD

[56] References Cited

U.S. PATENT DOCUMENTS 4,195,304 3/1980 Gudorf .................................. 346/75

4,368,476 1/1983 Uehara et al. ............... 346/140 PD 4,734,706 3/1988 Le et al. .................... 346/140 PDX

FOREIGN PATENT DOCUMENTS

DE 2943164 5/1980 Fed. Rep. of Germany .

DE 3500820 7/1986 Fed. Rep. of Germany .

*Primary Examiner*—George H. Miller, Jr.

*Attorney, Agent, or Firm*—Hill, Van Santen, Steadman & Simpson

[57] ABSTRACT

A head part comprising ink ejection channels in the ink printer head is cast into an outer mount with a rubber-elastic casting compound. A silanization layer is situated on the side of the discharge openings of the ink ejection channels. The hydrophobic effect of this silanization layer is intensified by silicone fluid added before the casting of the casting compound, since the silicone fluid diffusing out of the casting compound and later spreads by creeping and forms a layer of silicone fluid on the silanization layer. The layer of silicone fluid is constantly replenished from the inside of the casting compound. The layer of silicone fluid also simultaneously protects the silanization layer against hydrolysis. The instant invention is suitable for all ink printer heads that operate with aqueous ink.

17 Claims, 1 Drawing Sheet

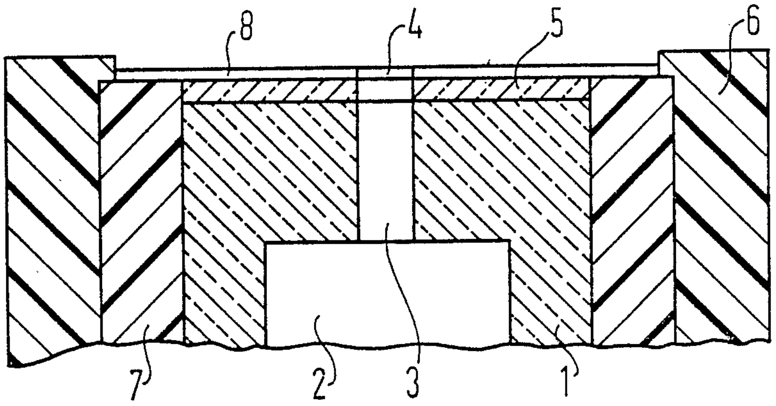
8
4
5
6
7
2
3
1

INK PRINTER HEAD

BACKGROUND OF THE INVENTION

The present invention is directed to an ink printer head including a head part, having ink ejection channels, that is cast into an outer mount with a rubber-elastic casting compound. The surface thereof is provided with an adhering, water-repelling silanization layer on a side of the discharge openings of the ink ejection channels.

In ink printer devices, the ejection of individual droplets from the discharge openings of the ink printer head is accomplished through the use of individually controllable drive elements. For example, small tubes composed of piezo-ceramic can be used as drive elements. The small tubes cylindrically surround the ink channels. No. DE-A-35 00 820 discloses an example of such a device. In what is known in the art as bubble-jet ink printer heads, heating elements that heat the liquid in the ink channel and cause the droplets to be ejected therefrom due to the formation of small bubbles are used as drive elements. No. DE-A-29 43 164 discloses an example of such a device.

With respect to the printer heads of ink printer devices the individual droplets ejected from the ink ejection channels are separated from the nozzle surface. This can be facilitated, for example, by creating the surface of the head parts so that they are non-moistenable by the ink on the side of the discharge openings of the ink ejection channels. This procedure also prevents ink from running out of the ink ejection channels and trickling onto the ink printer head when the printer device is idle.

It is known to use aqueous inks to cause the surfaces of the head parts to be water-repellant on the side of the ink discharge openings. Hydrophobic behavior is thereby achieved in that the surfaces are silanized, by chemically anchoring trimethyl siloxyl groups on the face-side surfaces by treating the head parts, preferably composed of glass, quartz, oxide ceramic or silicon, with a silylization agent such as trimethyl chlorosilane or hexamethyl disilazane.

The face-side surfaces are coated with a monomolecular, water-repelling layer. The chemical anchoring proceeds through Si—O—/Si elements or via Si—O—Al elements given aluminum oxide ceramic. However, these bonds are not completely hydrolysis-stable, and accordingly, the water-repelling effect decreases over time due to the lasting influence of the aqueous inks.

SUMMARY OF THE INVENTION

The present invention provides an ink printer head having a hydrolysis-stable and durable hydrophobic surface on the side of the discharge openings of the ink ejection channels.

To this end, an ink printer head is provided comprising a head part having ink ejection channels. The head part is cast into an outer mount with a rubber-elastic casting compound and the surface thereof, at the side of the discharge openings of the ink ejection channels, is provided with a firmly adhering, water-repelling silanization layer. Silicon fluid is stored in the casting compound as a component that is added thereto before the casting.

In an embodiment of the present invention, silicone caoutchouc mass is used as a casting compound.

In an embodiment of the present invention, a non-volatile, liquid fraction of poly-dimethylsiloxane is stored in the casting compound as a component that is added before the casting.

In an embodiment of the present invention, at least three weight percent silicone fluid is added to the casting compound.

In an embodiment of the present invention, not more than 50 weight percent silicone fluid is added to the casting compound.

In an embodiment of the present invention, between approximately 15 to about 25 weight percent silicone fluid is added to the casting compound.

Additional features and advantages of the present invention are described in, and will be apparent from, the detailed description of the presently preferred embodiments and from the drawing.

BRIEF DESCRIPTION OF THE DRAWING

The FIGURE illustrates a cross-sectional view of parts of an ink printer head.

DETAILED DESCRIPTION OF THE PRESENTLY PREFERRED EMBODIMENTS

The present invention provides an ink printer head having a hydrolysis-stable and durable surface on the side of the discharge openings of the ink ejection channels.

The invention is based on the perception that when silicone fluid is added to the casting compound, and thereby stored in the casting compound, it slowly diffuses out of the casting compound during the operation of the ink printer head and selectively spreads on the silanized surface of the head part. The silicone fluid thereby completely moistens the silanized surfaces. The silicone fluid thereby intensifies the hydrophobic action of the firmly adhering, mono-molecular siloxyl layer. Moreover, the silicone fluid simultaneously protects the latter against hydrolysis and is re-supplied from the interior of the casting compound when it has been eroded from the surface during the print mode either mechanically or due to cavitation.

As used herein, the term "casting compounds" refers to all rubber-elastic masses that can be processed by casting, to which silicone fluid can be added before processing and that, after the crosslinking, still contain the silicone fluid in a form that allows it to slowly diffuse out. As used herein, the term "silicone fluids" refers, in particular, to all linear-polymeric and cyclically polymeric dimethylsiloxanes as well as polymethyl phenylsiloxanes. These silicone fluids are typically clear, colorless, neutral, and odor-free hydrophobic liquids. The hydrophobic property, however, is to be considered in order to effect some of the advantages of the present invention.

It has been found that especially good results can be achieved by utilizing a silicone caoutchouc mass as the casting compound. These casting compounds exhibit a high degree of cross-linking and high elasticity. Both hot-vulcanizing, as well as, cold-vulcanizing silicone caoutchouc masses that can be processed by casting can be utilized.

In an embodiment of the present invention, it has been found to be advantageous when a non-volatile, liquid fraction of poly dimethyl siloxane is stored in the casting compound as a constituent that is added before the casting.

Because of the desired out-diffusion of the silicone fluid from the casting compound, preferably at least approximately three weight percent silicone fluid should be added to the casting compound. On the other hand, in view of the desired stability properties of the casting compound, preferably, no more than approximately 50 weight percent silicone fluid should be added to the casting compound. In a preferred embodiment, between approximately 15 to about 25 weight percent silicone fluid is added to the casting compound.

Referring now to the FIGURE, the FIGURE illustrates in cross-section, parts of an ink printer head. For example, a head part manufactured in planar technology is illustrated, having an ink delivery channel 2, a narrower ink ejection channel 3 that is joined thereto and a discharge opening 4 for the ink ejection channel 3. It should be noted that, in reality, the head part 1 comprises a plurality of the said channels and a plurality of ink discharge openings 4. The head part 1 can be, for example, constructed from glass, quartz, and silicon.

A firmly adhering, water-repelling silanization layer 5, produced by treatment with a silylization agent, is located on the head part 1 at the side of the discharge openings 4, i.e., on that side of the head part 1 facing toward the paper during operation. The silylization agent can be, for example, trimethyl chlorosilane.

After the electrical leads are soldered, the head part 1 that is created, for example, of a bubble-jet print head, is cast into an outer mount 6 so that it can be secured to a carriage (not illustrated). The mount 6 can be, for example, composed of a solid plastic. A casting compound 7 that remains flexible, preferably a silicone caoutchouc mass, is employed for casting.

Pursuant to the present invention, a specific amount of silicone fluid is added to the casting compound 7 and is finely distributed by mixing. The casting compound 7 is then processed. The silicone fluid will then slowly diffuse out of the casting compound 7 during operation of the ink printer head. The silicone fluid spreads by creeping, whereby a complete moistening of the silanization layer 5 occurs.

The silicone fluid as it diffuses creates a layer 8. The layer 8 of silicone fluid, arising as a result of this moistening, intensifies the hydrophobic effect of the monomolecular siloxyl layer lying therebelow. Simultaneously, the layer 8 protects this siloxyl layer against hydrolysis and is resupplied from the inside of the casting compound 7 as the layer 8 of silicone fluid is eroded either mechanically or due to cavitation during the printing mode. Pursuant to the present invention, even given a lasting influence of aqueous inks, the water-repelling effect can thus be reliably maintained.

By way of example, and not limitation, an example of the present invention will now be given.

A silicone caoutchouc available under the designation Wacker-Silikon RTV 1 from Wacker Chemie GmbH, 8000 Munich, Germany, was used as the casting compound 7. To this casting compound, 20 weight percent silicone fluid was added. The silicone fluid used is designated Wacker- Silikonoel AK 350 by the same manufacturer as the casting compound. The silicone fluid was added before processing. Comparatively good results were capable of being achieved with an additive of 20 weight percent of this silicone fluid to the Wacker-Silikon HTV R 100 of the same manufacturer.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An ink printer head comprising a head part having ink ejection channels, said head part being cast into an outer mount with a rubber-elastic casting compound and the surface thereof at the side of the discharge openings of the ink ejection channels being provided with a firmly adhering, water-repelling silanization layer wherein silicon fluid is stored in the casting compound as a component added thereto before the casting.

2. The ink printer head of claim 1 wherein a silicone caoutchouc mass is used as a casting compound.

3. The ink printer head of claim 2 wherein a non-volatile, liquid fraction of poly-dimethylsiloxane is stored in the casting compound as a component to be added before the casting.

4. The ink printer head of claim 2 wherein at least approximately three weight percent silicon fluid is added to the casting compound.

5. The ink printer head of claim 2 wherein no more than approximately 50 weight percent silicone fluid is added to the casting compound.

6. The ink printer head of claim 2 wherein approximately 15 to about 25 weight percent silicone fluid is added to the casting compound.

7. The ink printer head of claim 1 wherein a non-volatile, liquid fraction of poly-dimethylsiloxane is stored in the casting compound as a component to be added before the casting.

8. The ink printer head of claim 7 wherein at least approximately three weight percent silicon fluid is added to the casting compound.

9. The ink printer head of claim 7 wherein no more than approximately 50 weight percent silicone fluid is added to the casting compound.

10. The ink printer head of claim 7 wherein approximately 15 to about 25 weight percent silicone fluid is added to the casting compound.

11. The ink printer head of claim 1 wherein at least approximately three weight percent silicon fluid is added to the casting compound.

12. The ink printer head of claim 1 wherein no more than approximately 50 weight percent silicone fluid is added to the casting compound.

13. The ink printer head of claim 1 wherein between approximately 15 to about 25 weight percent silicone fluid is added to the casting compound.

14. An ink printer head including a head portion having ink ejection channels, the head portion is cast into an outer mount with a rubber-elastic casting compound and the surface thereof at the side of the discharge openings of the ink ejection channels is provided with a silanization layer wherein the casting compound includes at least approximately 3 percent by weight and no more than approximately 50 percent by weight silicone fluid added to the casting compound as a component before the casting.

15. The ink printer head of claim 14 wherein a silicone caoutchouc mass is used as a casting compound.

16. The ink printer head of claim 14 wherein a non-volatile, liquid fraction of poly-dimethylsiloxane is stored in the casting compound as a component to be added before the casting.

17. The ink printer head of claim 14 wherein between approximately 15 to about 25 weight percent silicone fluid is added to the casting compound.

* * * * *